INVENTOR
Jean Wiemer

Sept. 26, 1967   J. WIEMER   3,343,341
APPARATUS FOR THE WET CLEANING OF DUST FROM GAS
Filed Feb. 23, 1965   4 Sheets-Sheet 3

INVENTOR
Jean Wiemer

BY *Bailey, Stephens and Huettig*
ATTORNEYS

Sept. 26, 1967   J. WIEMER   3,343,341
APPARATUS FOR THE WET CLEANING OF DUST FROM GAS
Filed Feb. 23, 1965   4 Sheets-Sheet 4

INVENTOR
Jean Wiemer

BY Bailey, Stephens and Huettig
ATTORNEYS

United States Patent Office 3,343,341
Patented Sept. 26, 1967

3,343,341
APPARATUS FOR THE WET CLEANING OF DUST FROM GAS
Jean Wiemer, Oberhochstadt, Taunus, Germany, assignor to Metallgesellschaft Aktiengesellschaft, Frankfurt am Main, Germany
Filed Feb. 23, 1965, Ser. No. 434,327
Claims priority, application Germany, Feb. 25, 1964, M 60,050
7 Claims. (Cl. 55—225)

This invention relates to an apparatus for the wet cleaning of dust from gas and in particular to an improved means for wetting the dust in the gas.

Numerous devices have been used for the wet treatment of dust-containing gas as well as for the cooling of the gas wherein the gas passes through the apparatus in parallel flow, countercurrent flow, or transverse flow to the flow of the cleaning liquid. Such a washing and cooling apparatus may have several sets of cleaning liquid nozzles so that it is possible to turn on or turn off sets of these nozzles so that the apparatus can be operated at optimum efficiency depending upon the quantity of gas being treated. Venturi washers are quite effective for the cleaning and cooling of hot gases containing fine dust particles. In a venturi washer, the cleaning liquid is ordinarily applied at the narrowest part of the venturi neck. Thus the cleaning liquid is injected from sets of nozzles radially arranged at right angles to the flow of the gas in the venturi washer so that cleaning liquid is directed into the gas at right angles to the flow of gas, or conical spray nozzles are positioned for injecting a cone of liquid into the smallest part of the neck of the washer. When used with a converter, variations occur in the quantity of gas passing through the washer, and this lowers the efficiency of the dust precipitation. To increase this efficiency, even with changing volumes of gas, it has been suggested to position baffles in the narrowest portion of the venturi neck so that the velocity of gas flow through the washer remains constant. In this arrangement, the efficiency of dust precipitation largely depends upon the relative velocity between the injected liquid and the gas flow.

Apparatuses have been used in which a wet cyclone has been combined with a venturi washer so that the venturi washer forms the central core of the cyclone. Also, other combinations of washers following one another have been used in order to obtain as high as possible a degree of dust precipitation and cooling.

When gaseous components are to be washed and/or separated from the raw gas being cleaned, it is necessary that the cleaning liquid comes into intimate contact with the raw gas. Usually in such an arrangement, the raw gas is first cleaned by mechanical or electrical precipitators. Such is successful only if the type of dust in the raw gas can be almost completely precipitated. When the gas contains extremely fine dust, a washing method may be used instead of the mechanical or electrical precipitators. However, such arrangements are not entirely satisfactory because of the high cost of constructing the apparatus and the relatively low cleaning efficiency.

The object of this invention is to produce an apparatus at low cost and of high efficiency for the cleaning and/or cooling of gases.

This invention employs a cylindrical or polygonal washer housing having liquid spray nozzles mounted on the interior of its side wall and having an opening in a ceiling leading into a slot formed between annular frustoconically divergent surfaces and positioned at right angles to the flow of gas through the housing. This annular slot is formed in part by the ceiling of the housing and in part by a plate mounted above or below the opening of the housing, with the plate in cross-section having the outline of half a cone. In this invention, means are provided for varying the size of the slot opening by lifting or lowering this plate. Furthermore, according to this invention, conical spray nozzles are mounted adjacent the ceiling opening so that the liquid sprays are discharged into the narrowest portion of the annular slot. This slot therefor has, in a sense, the same effect as several venturi washers directed into the neck portion of a venturi, and further has a gas discharge slot which can be adjusted according to the volume of gas flowing through the apparatus.

An apparatus constructed according to this invention has the advantage of requiring little floor space, low construction cost, and high cleaning efficiency.

The means by which the objects of the invention are obtained are described more fully with reference to the accompanying drawings in which.

Figure 1:
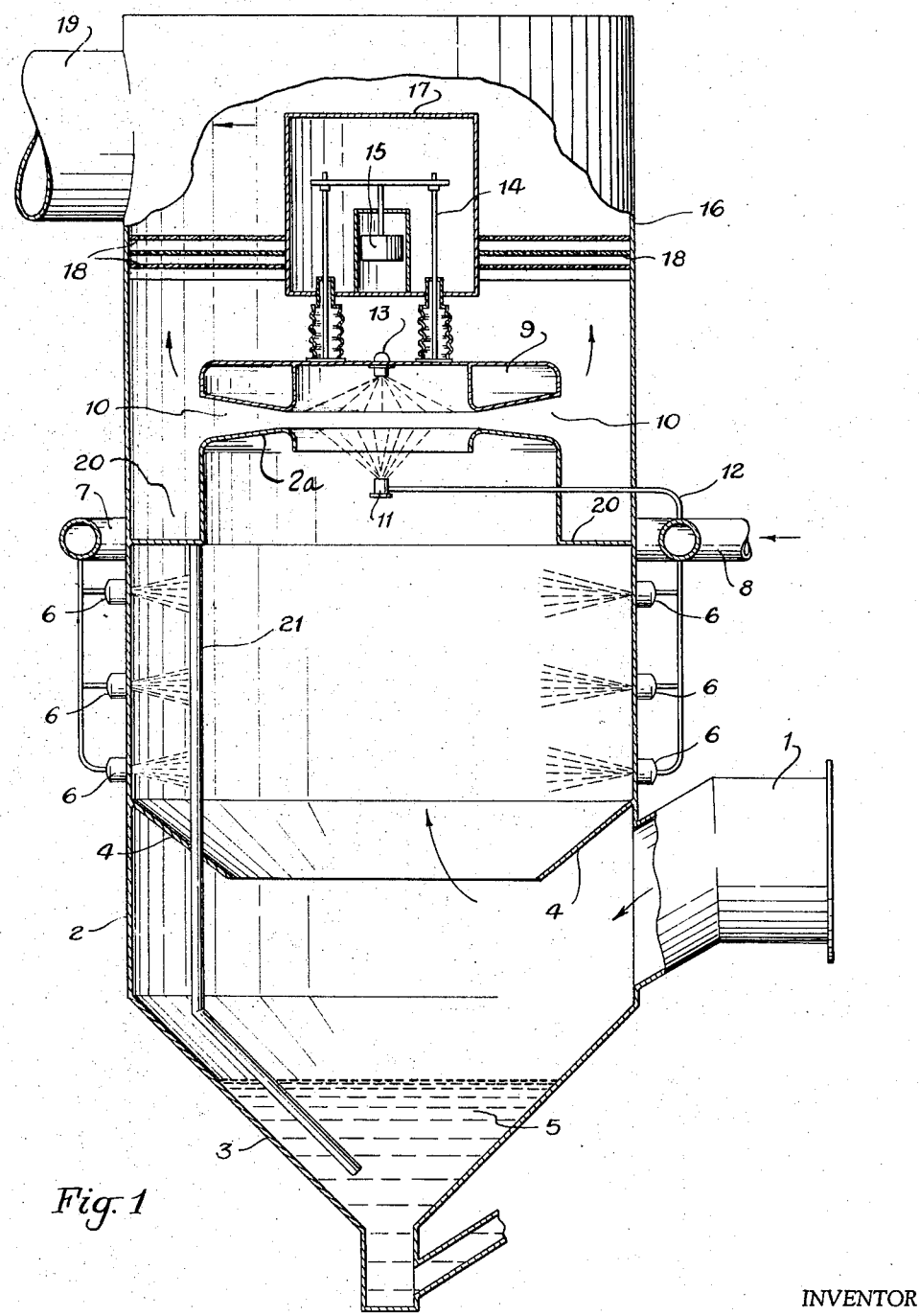
FIGURE 1 is a vertical cross-sectional view through the apparatus of this invention.

As shown in FIGURE 1, a raw gas intake pipe 1 leads into the bottom portion of the housing 2 of the apparatus. The housing 2 has a ceiling 2a and a conical bottom 3 forming a sump. Mounted above the bottom 3 are baffles 4 for causing the incoming gas to swirl against the surface of the liquid 5 in the sump and thus causing droplets of liquid to be carried along with the gas. The gas flows vertically upward through housing 2 and is wetted with liquid from spray nozzles 6 mounted in the side wall of the housing. The liquid flows through a manifold 7 supplied with liquid from intake pipe 8 and then into and through nozzles 6. Accordingly, the gas flowing through housing 2 is initially intimately mixed with liquid. Ceiling 2a has a raised portion with an opening therethrough. This opening is partially closed by a plate 9 so as to form an annular slot 10 extending at right angles to the vertical flow of the gas in housing 2. This discharge slot 10 is conically divergent outwardly from the center of the ceiling opening. A conical liquid spray nozzle 11 is positioned beneath and directed toward the ceiling opening and is supplied with liquid through pipe 12 joined to manifold 7. A second conical spray nozzle 13 is mounted on plate 9 and directed toward the ceiling opening. Thus, liquid from each of the facing nozzles is mixed at the narrowest portion of the slot 10. Consequently, the dust-laden gas passing through slot 10 becomes much more intimately mixed with the liquid because the velocity of the gas through the slot pulls the liquid along and diffuses it in the gas in a manner analogous to a venturi washer. A mechanical, pneumatic or hydraulic lifting means composed of rods 14 connected between plate 9 and piston 15 is used for adjusting the width of the slot 10 so that the volume of gas passing through the slot can be regulated. Fluid is introduced into the cylinder holding piston 15 by suitable means, not shown, to raise and lower the piston and thus lifts and lowers plate 9. A non-turbulent gas chamber 16 is mounted above housing ceiling 2a and contains a secondary housing 17 within which the rods 14 and piston 15 are mounted. Extending between the inner wall of chamber 16 and the secondary housing 17 are perforated plates 18 which function as liquid droplet precipitators. The clean gas leaves the chamber 16 through the exhaust duct 19. The ceiling 2a also forms a gutter 20 in the bottom of chamber 16, and this gutter is joined to a drain pipe 21 extending into the bottom 3.

Figure 2:
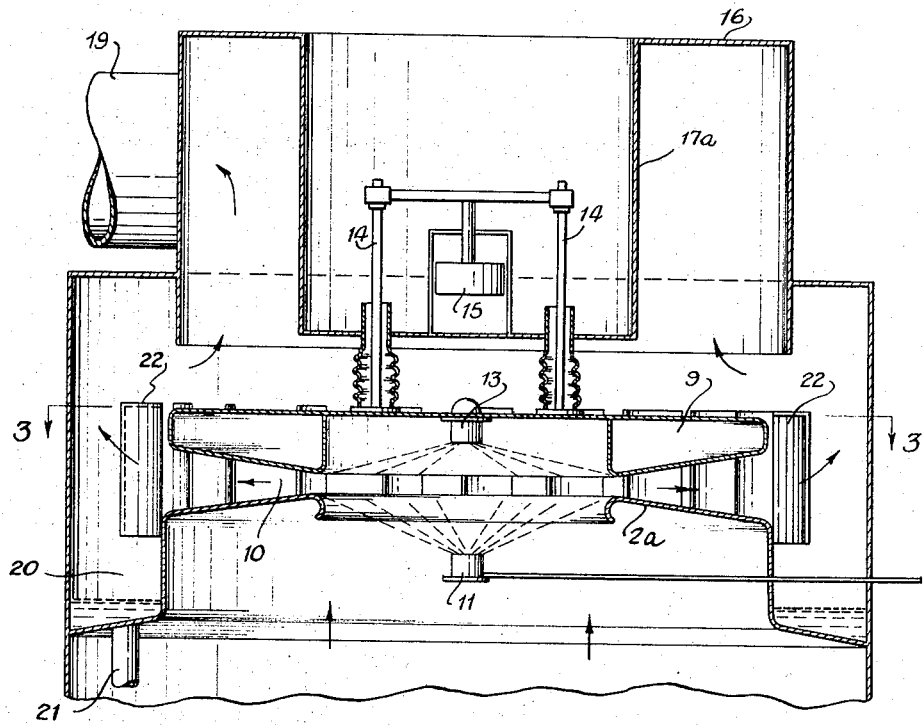
FIGURE 2 is an enlarged cross-sectional view of a modified form of the apparatus.
Figure 3:
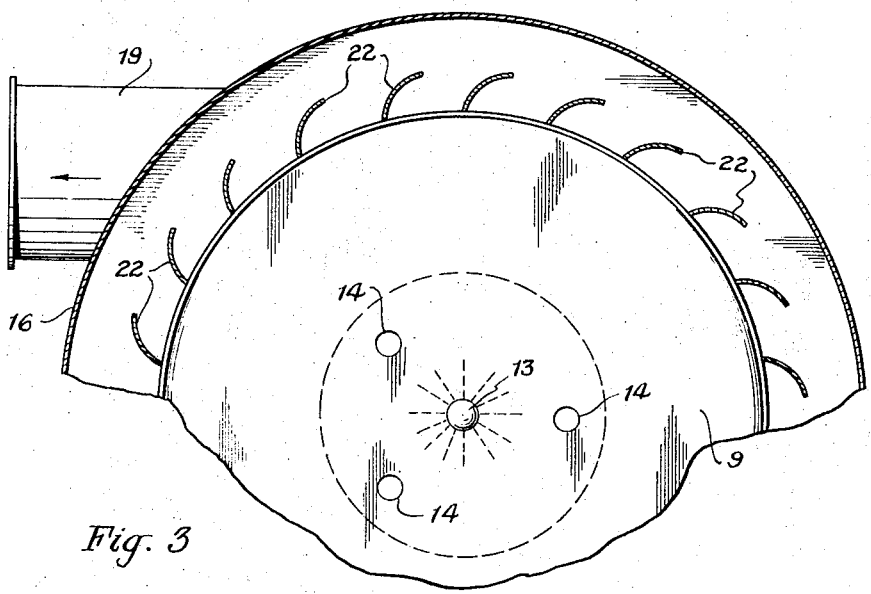
FIGURE 3 is a cross-sectional view taken on the line 3—3 of FIGURE 2.

In the modification of FIGURES 2 and 3, vanes 22 are mounted on ceiling 2a around the periphery of the slot 10 for deflecting the gas into a swirl in order to precipitate liquid droplets. Also, as shown in FIGURE 2, the secondary housing 17a is not wholly enclosed within the non-turbulent chamber 16 but is exposed vertically to the atmosphere.

Figure 4:
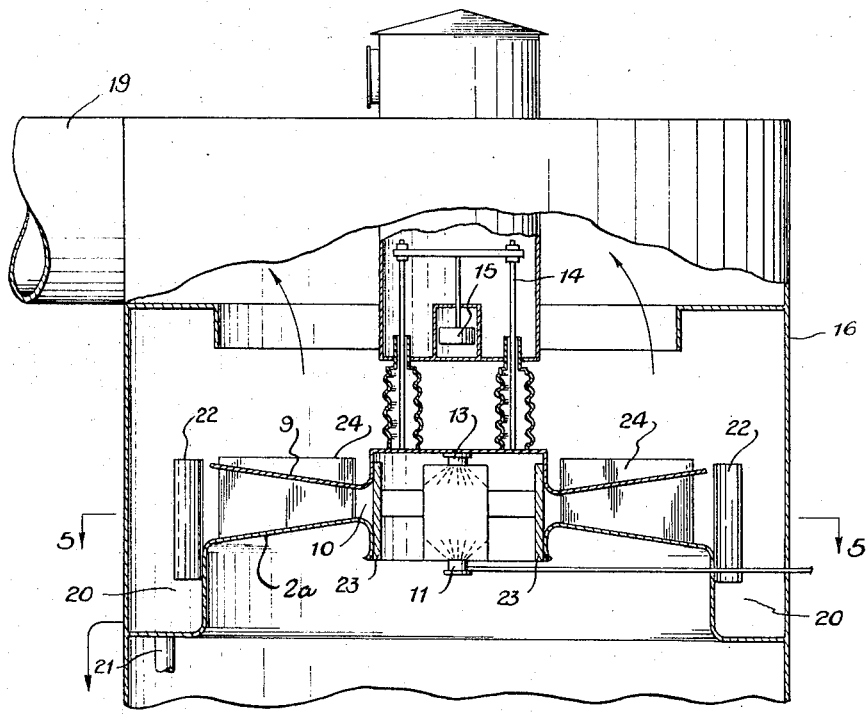
FIGURE 4 is a view similar to FIGURE 2 of a further modified form of the apparatus.
Figure 5:
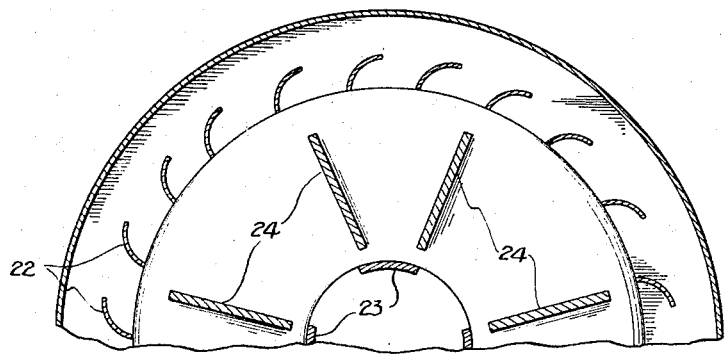
FIGURE 5 is a partial cross-sectional view taken on the line 5—5 of FIGURE 4.

In the modification of FIGURES 4 and 5, the slot 10 is partially closed off by spaced baffles 23 mounted on ceiling 2a from adjacent the ends of which radially extend partitions 24 mounted on ceiling 2a entirely around the annular slot. These partitions 24 prevent gas swirls over the area in the slot shielded by the baffles 23.

Figure 6:
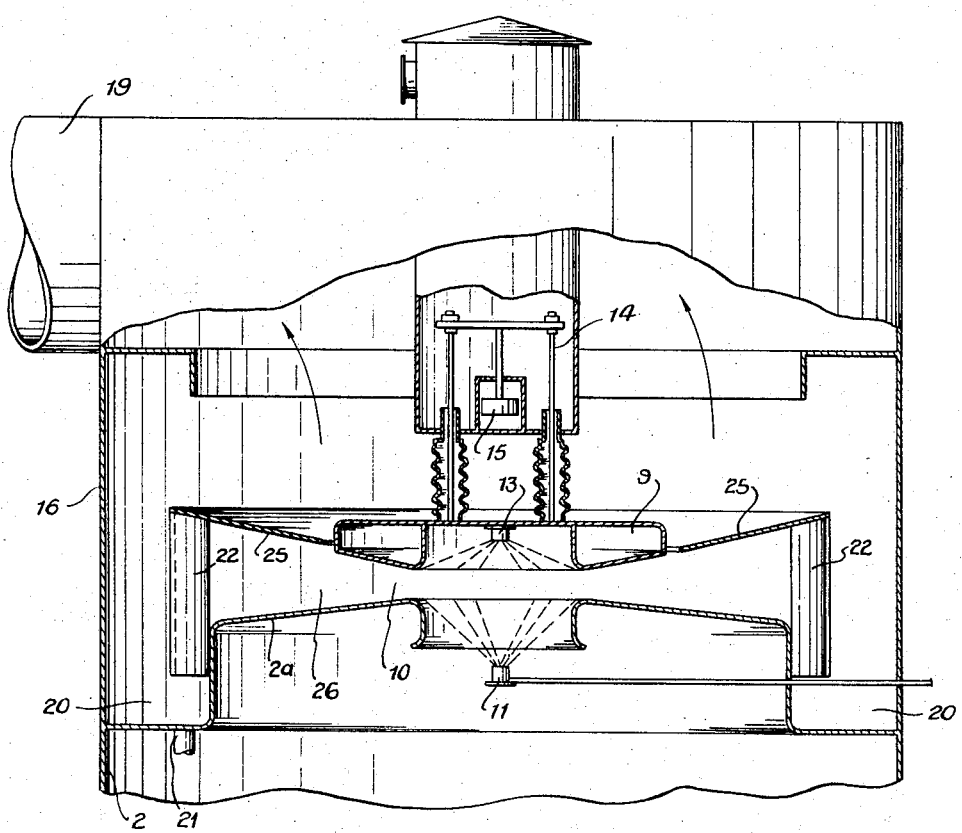
FIGURE 6 is a cross-sectional view of another modified form of the invention.

In the modification of FIGURE 6, the effective length of the slot 10 is increased by means of an annular flange 25 mounted on vanes 22 so that the slot 10 is composed of the annular slot 10 and the slot 26 which has a width fixed between the ceiling 2a and the flange 25. Correspondingly, the diameter of the plate 9 can be relatively decreased when the apparatus housing 2 has a very large cross-sectional area.

Having now described the means by which the objects of the invention are obtained, I claim:

1. An apparatus for the wet cleaning of dust from gas comprising a housing having a side wall, a bottom and a ceiling, liquid spray nozzle means mounted on said side wall for spraying cleaning liquid into said housing, gas inlet means in said side wall adjacent said bottom, a gas outlet opening in said ceiling, and plate means mounted over said opening and part of said ceiling forming an annular diverging slot between said plate means and ceiling directed toward said side wall, said slot being formed between frusto-conically diverging surfaces of said ceiling and plate means, respectively, and together with said opening form a venturi-like gas passageway substantially at a right angle to the vertical axis of said housing, said slot at its narrowest point having a smaller inlet cross-sectional area than said opening and a larger outlet area than said opening, and said surfaces being divergent upwardly and downwardly with respect to each other.

2. An apparatus as in claim 1, further comprising liquid spray nozzles facing each other mounted above and below said opening in said ceiling for spraying gas passing into said slot.

3. An apparatus as in claim 2, further comprising vane means mounted around the periphery of said plate means and perpendicular to the flow of gas through said slot for deflecting the flow of gas coming from said slot and aiding in the precipitation of liquid droplets from the gas.

4. An apparatus as in claim 2, further comprising non-turbulent gas chamber means mounted above said ceiling and around said plate means, and liquid precipitating plate means mounted in said chamber means for removing dust containing liquid droplets from the gas in said chamber means.

5. An apparatus as in claim 2, further comprising a plurality of baffles spaced from each other and mounted in said slot, and guiding partition means mounted in said slot and extending radially outward from the ends of said baffles for preventing gas swirls and loss of gas pressure in the gas passing through said slot.

6. An apparatus as in claim 2, further comprising gutter means on the upper surface of said ceiling for collecting liquid separated from the gas in said chamber means, and drain pipe means extending from said gutter means to the bottom of said housing.

7. An apparatus as in claim 6, further comprising annular flange means mounted above said ceiling and around said opening for extending the length of said slot between said ceiling and said plate means.

References Cited
UNITED STATES PATENTS

| | | | |
|---|---|---|---|
| 1,866,443 | 7/1932 | Zumbro | 55—257 X |
| 1,894,744 | 1/1933 | Hawley | 55—223 |
| 2,354,674 | 8/1944 | Fisher | 55—238 X |
| 3,048,956 | 8/1962 | Lundy et al. | 55—235 |
| 3,113,168 | 12/1963 | Kinney | 261—116 X |
| 3,119,675 | 1/1964 | Gallagher | 261—118 X |
| 3,199,267 | 8/1965 | Hausberg | 55—257 X |

HARRY B. THORNTON, *Primary Examiner.*

ROBERT F. BURNETT, *Examiner.*

D. K. DENENBERG, D. TALBERT,
*Assistant Examiners.*